United States Patent [19]
Kaiho

[11] 3,771,313
[45] Nov. 13, 1973

[54] GENERATION OF MOTIVE POWER WITH METAL AND WATER AS FUEL

[76] Inventor: Yoshiharu Kaiho, 287 Ushinuna, Akita-Machi, Nishitama-gun, Tokyo, Japan

[22] Filed: May 3, 1971

[21] Appl. No.: 139,406

[30] Foreign Application Priority Data
May 12, 1970 Japan.............................. 45/39727

[52] U.S. Cl.................. 60/216, 60/217, 60/221, 60/227, 60/240, 60/39.46
[51] Int. Cl........ F02k 7/08, F23r 1/18, B63h 11/14
[58] Field of Search.............. 60/227, 207, 215–217, 60/39.46, 251, 243, 240, 219, 39.47, 39.71, 211–213; 44/51, 67

[56] References Cited
UNITED STATES PATENTS

| | | | |
|---|---|---|---|
| 2,971,325 | 2/1961 | Gongwer | 60/227 |
| 3,149,458 | 9/1964 | Harris | 60/207 |
| 3,357,186 | 12/1967 | Multer | 60/219 |
| 3,525,223 | 8/1970 | Radebold et al. | 60/207 |
| 2,589,074 | 3/1952 | Goodwin | 60/243 |
| 2,799,136 | 7/1957 | de Boisblanc | 60/243 |
| 3,044,253 | 7/1962 | Zwicky | 60/227 |
| 2,500,334 | 3/1950 | Zucrow | 60/39.46 |
| 3,256,688 | 6/1966 | Hill | 60/39.46 |
| 2,574,495 | 11/1951 | Parker | 60/39.46 |

*Primary Examiner*—Carlton R. Croyle
*Assistant Examiner*—Robert E. Garrett
*Attorney*—Ward, McElhannon, Brooks & Fitzpatrick

[57] ABSTRACT

A metal such as aluminum, magnesium, or zinc in the form of granules of high fluidity is injected as a spray by high-pressure steam into a heated reaction chamber, and high-temperature steam is injected against this spray to cause exothermic reaction between the now molten metal and water, additional water being injected into the reaction system thereby to complete the reaction, to cause surplus water to be vaporized by the heat of reaction, and to generate high-temperature, high-pressure steam for motive power.

14 Claims, 3 Drawing Figures

GENERATION OF MOTIVE POWER WITH METAL AND WATER AS FUEL

BACKGROUND OF THE INVENTION

This invention relates generally to motive power generation and to fuels. More particularly, the invention relates to a new and advanced method and means for generating motive power by using metals as fuel to react with water.

The reaction of molten aluminum (Al) and water ($H_2O$), for example, may be represented by the following formula.

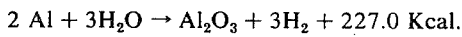

$$2\ Al + 3H_2O \rightarrow Al_2O_3 + 3H_2 + 227.0\ Kcal.$$

As indicated, much heat is generated in this reaction. Various proposals have heretofore been made for utilizing this reaction heat as a motive power source of underwater engines.

In order to make practical use of this reaction, however, it is necessary to give special considerations to features of means therefor such as an ignition mechanism, a combustion mechanism for continuously melting the fuel during operation and sustaining the reaction of the fuel and water in a stable and continuous manner, a control mechanism for affording rapid output variations during the operation including restarting, and a generally heat-withstanding structure.

Devices in which this reaction have heretofore been utilized have invariably been those made for the purpose of only a single use for a short time as in the case of torpedoes and the like. In all such cases, the above described problem must be solved. For supplying the fuel, for example, methods such as that of stacking aluminum foil sheets, pushing these sheets toward a reaction chamber, thereby causing these sheets to be progressively melted from their leading part by heat transferred from the reaction chamber, and supplying the resulting molten metal into the reaction chamber must be resorted to. In an alternative method, aluminum is first processed into a colloidal suspension fluid and then used. All of these methods require the use of special means or of fuel materials prepared by complicated processes. None of the previously proposed methods and means of the instant kind have been reduced to practical use, as far as I am aware.

SUMMARY OF THE INVENTION

It is an object of this invention to provide a method and apparatus for generating motive power through the use of metals as fuel in a positive and efficient manner at relatively low cost.

The foregoing object and other objects of the invention have been achieved by using at least one metal such as aluminum (Al), magnesium (Mg), zinc (Zn), and alloys thereof in molten state as a fuel in an exothermic reaction with water and vaporizing water with the resulting heat of reaction thereby to generate steam at a high temperature and high pressure for motive power.

According to this invention in one aspect thereof, briefly summarized, there is provided a method of generating motive power generally as described above, wherein: the metal is supplied in a granular form of high fluidity together with a portion of the reaction water, this water being vaporized by heat exchange into high-pressure steam to inject the metal granules as a fine spray into a heated reaction system; the remainder of the reaction water is directed as high-temperature steam against this spray to cause an exothermic reaction between the now molten metal and water; and additional water is injected into the reaction system thereby to complete the reaction, to cause surplus water to be vaporized by the heat of reaction, and to generate high-temperature, high-pressure steam for motive power, the heat absorbed in the vaporization of the surplus water being utilized to maintain the reaction system temperature within a maximum limit.

According to this invention in another aspect thereof, there is provided an apparatus for carrying out the above summarized method, a feature of this apparatus being an arrangement of parts for heat exchanges whereby the operation is rendered self-sustaining except during starting and restarting.

The nature, principle, and utility of this invention will be more clearly apparent from the following detailed description beginning with a consideration of general features of the invention and concluding with an example of preferred embodiment of the invention, when read in conjunction with the accompanying drawing, in which like parts are designated by like reference numerals.

DETAILED DESCRIPTION

Figure 1:
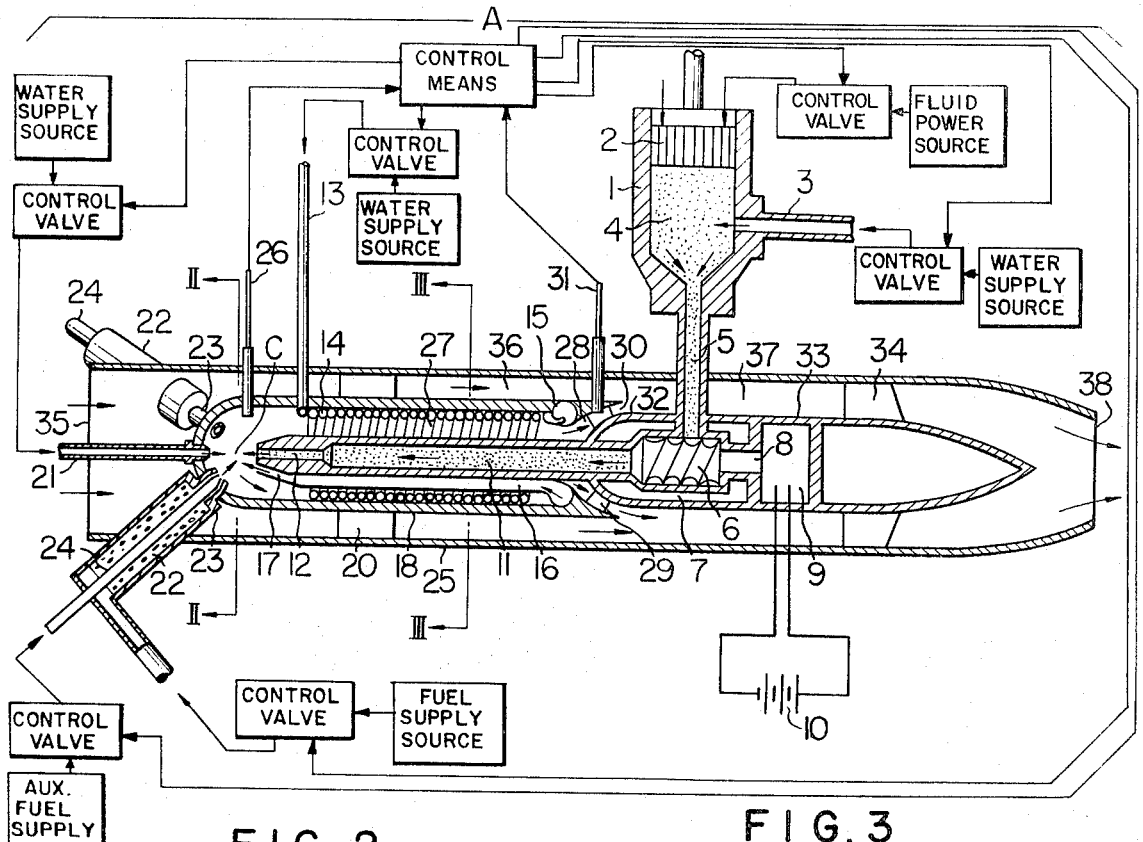
FIG. 1 is a side view, for the most part in longitudinal section, showing the essential parts in assembled state of an underwater jet engine constituting an embodiment of this invention.
Figure 2:
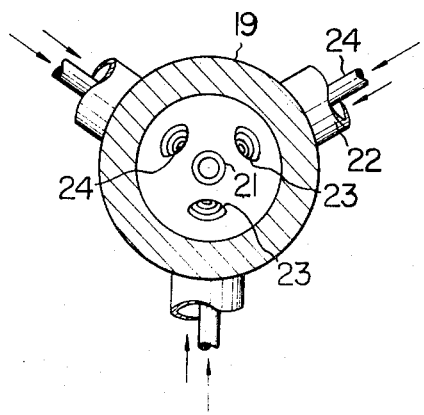
FIG. 2 is a cross section taken along the plane indicated by line II—II in FIG. 1 as viewed in the arrow direction.
Figure 3:
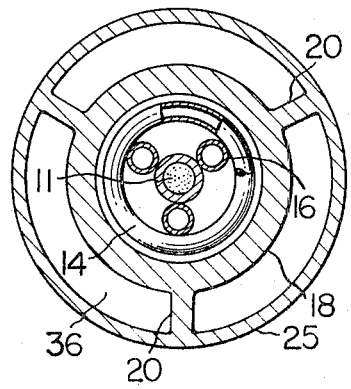
FIG. 3 is a cross section taken along the plane indicated by line III - III in FIG. 1 as viewed in the arrow direction.

In view of the aforedescribed problems, the following points and features were considered in the development of this invention.

1. In order to facilitate the supply of fuel, aluminum particles (example: "atomized aluminum", Type VA, Yamaishi Kinzoku, Japan, sold on the market) of fluid character are used. I have found that the supplying of this fuel can be readily accomplished by an ordinary screw pump in the same manner as a fluid.

2. For starting and restarting, an auxiliary burner is provided for burning a fuel such as a mixture of hydrogen peroxide ($H_2O_2$)+ hydrazine ($N_2H_4$). At the time of starting, this burner is first used to preheat a reaction chamber and prepare the reaction conditions. Furthermore, the main fuel is melted by this burner and caused to start reacting. Accordingly, restarting can also be carried out easily. Moreover, this auxiliary burner is adapted for use at any time as an auxiliary heat source for instances when the conditions within the reaction chamber are greatly disturbed by abrupt output control.

3. For maintaining continuously a stable reaction during operation, a portion of the water necessary for the reaction is supplied together with the metal fuel and utilized additionally for lubricating the movement of the fuel at the time it is supplied under pressure and for suppressing leakage of gases from the reaction chamber toward the metal fuel feeding mechanism. At the same time, the water thus supplied with the metal fuel is preheated simultaneously therewith and prevents mutual cohesion due to fusion between the fuel particles heated to temperatures immediately below their melting point. Moreover, the steam vaporized during this operation becomes a high-speed vapor stream ejected through a nozzle, whereby it injects the fuel as a fine spray into the reaction chamber and establishes optimum conditions for facilitating the reaction.

4. In addition, another portion of the water necessary for the reaction is conducted through a coiled tube in the reaction chamber to a point in the vicinity of the fuel injection orifice and vaporized by heat exchange into high-temperature steam, which is caused to mix directly with the fuel being injected thereby to cause the fuel and water to begin reacting immediately after ejection from the nozzle.

5. Water is separately injected into the reaction chamber through a main nozzle to supply a quantity of water for completing the reaction which has already been started and, at the same time, to vaporize surplus water by utilizing the heat of reaction. Furthermore, the absorption of heat of vaporization is utilized to maintain the interior of the reaction chamber at a suitable temperature so that high-temperature, high-pressure steam is continuously generated. I have found that, as a result of this feature, it is possible to suppress any rise in the reaction chamber temperature and thereby to solve the problem of heat resistance.

6. Furthermore, in accordance with necessity, a suitable quantity of hydrogen peroxide ($H_2O_2$) is admixed with this water thereby to cause combustion of hydrogen which is a reaction product, whereby the efficiency of the motive power generation is increased, and, at the same time, exhausting of the motive power means without gas bubbles is made possible in the case where the ambient medium is water.

7. The output during operation is controlled by varying the rate of supply of the fuel particles, and the quantity of water necessary therefor is uniformly controlled so as to maintain the temperature of the reaction chamber at a suitable value in accordance with the measurands of temperature gages installed at the central and exhaust end parts of the reaction chamber. I have found that the aforementioned auxiliary burner can be advantageously utilized as an auxiliary heat source for maintaining this optimum temperature.

In order to indicate more fully the details of this invention, the following description of the organization and operation of an underwater jet engine (hereinafter referred to simply as "engine"), constituting a preferred embodiment of the invention, is set forth, it being understood that this example is presented as illustative only, and that it is not intended to limit the scope of the invention.

Throughout the following description, the directional terms "front" and "forward" designate the upstream direction (toward the left as viewed in FIG. 1), while "rear" and "rearward" designate the downstream or opposite direction.

Referring to FIG. 1, showing the principal parts of the engine, the engine system A has an engine outer cylinder 25 provided at the forward end thereof with a water intake 35 for taking in surrounding water, at the middle part thereof with a cross-sectional shape suitable for the internal construction thereof, and at the rear part thereof with a water discharge outlet or water-jet nozzle 38.

The outer cylinder 25 houses in the forward half part thereof an inner cylinder constituting a reaction tube 18 fixedly and concentrically supported therein by brackets 20 (at two or more points), an annular water passage 36 being formed between the inner surface of the outer cylinder 25 and the outer surface of the reaction tube 18. The forward part of this reaction tube 18 has a streamlined outer shape and constitutes a reaction chamber 19. The heat-sensor part 26 of a temperature gage for this reaction chamber 19 is inserted thereinto from the outside. The reaction tube 18 is of integral construction made of a heat-resistant, non-corroding material.

The reaction tube 18 is provided therewithin with a helically coiled tube structure 14 disposed concentrically therewith and in contact with the inner surface of the reaction tube. The rear outlet end of this coiled tube structure 14 is inserted into and welded to an annular collector pipe 15 fixed to the rear end of the reaction tube 18 and, together with a pump fairing 32, forming a reaction-gas nozzle 28 of annular shape with an outlet 30. A plurality of reaction-gas steadying vanes 29 are disposed in the nozzle 28 and are fixed to the collector pipe 15 and the fairing 32. The heat-sensor part 31 of a temperature gage for the reaction-gas outlet is inserted from the outside into the reaction-gas nozzle 28 at a point midway between adjacent vanes 29.

The front end of the coiled tube 14 is communicatively connected to an outside water supply (not shown) by a water pipe 13 passed through the walls of the reaction tube 18 and the engine outer cylinder 25.

The inclined rear ends of three superheated-steam pipes 16 are communicatively connected and welded to the aforementioned steam collector pipe 15, these pipes 16 being installed with equal circumferential spacing within an annular gap formed between a fuel preheating pipe 11 to be described hereinafter and the aforementioned coiled tube structure 14. The front ends of these superheated-steam pipes 16 are inclined and directed toward the center C of the reaction chamber 19 and surround with equal circumferential spacing a fuel nozzle 12 to be described hereinafter, thereby forming steam nozzles 17 of slightly constrictive or throttled configuration directed toward the reaction chamber center C.

The above mentioned fuel preheating pipe 11 has a rear end extending into the pump fairing 32 and communicating with the front end of the casing 7 of a screw pump 6 housed within a streamlined nacelle 33 the front part of which is the fairing 32. The screw pump 6 is supplied in the following manner with metal fuel from a fuel tank 1 of pressure-resistant cylinder type provided therein with a fuel piston 2 which can be freely removed for charging of granular metal fuel into the fuel tank. After the fuel tank 1 is thus charged with granular metal fuel, the piston 2 is sealed in a water-tight manner and is caused to exert the necessary pressure on the fuel 4 by means of a separate mechanism (not shown), irrespective of variations in the quantity of remaining fuel, and thereby delivers the fuel under constant conditions to the screw pump 6 through a fuel-feeding pipe 5.

The fuel tank 1 is provided at a lower part thereof with a water-supply pipe 3, through which water is supplied under pressure into the fuel tank by a water-supply pump (not shown). The water thus supplied fills the voids between the particles within the fuel system to become a gas seal between the reaction chamber and the screw pump 6. Furthermore, this water functions as a lubricant for the metal fuel in granular form during its feeding under pressure and, in addition, becomes a portion of the reaction water introduced into the reaction chamber 19.

The fuel 4 in the fuel tank 1 is forced by pressure exerted by the piston 2 to pass through the fuel-feeding pipe 5 and to be thus fed always under constant conditions to the screw pump 6. The screw pump 6 is driven through a drive shaft 8 by an electric motor 9 also housed within the nacelle 33. The fuel, together with the water supplied through pipe 3, is thus forced under pressure by the screw pump 6 to move through the aforementioned fuel-preheating pipe 11 and be injected through a fuel nozzle 12 at the front end of the pipe 11 toward the center C of the reaction chamber 19.

The nacelle 33 of streamlined form, housing therein the screw pump 6 and the motor 9, is fixedly supported in coaxial disposition in the rear half part of the engine outer cylinder 25 by three vane-like struts 34 functioning as brackets. An annular passage is formed between the inner surface of the outer cylinder 25 and the outer surface of the nacelle 33 and constitutes a heat-exchange section 37 as described hereinafter.

At the front end of the reaction chamber 19, a main water nozzle 21 is passed through and fixed to the chamber wall in opposed and coaxial alinement with the fuel nozzle 12. This main water nozzle 21 operates to inject water or a mixture thereof with hydrogen peroxide into the reaction chamber 19 toward the center C thereof in order to complete the reaction and, in addition, to maintain at suitable value the temperature of the reaction chamber 19 which tends to rise.

Around the main water nozzle 21, there are provided three burners of spontaneous combustion characteristic disposed at equal intervals (120° of angle) on a common circle and directed toward the center C of the reaction chamber. These burners are adapted to use as fuel hydrogen peroxide and substances such as hydrazine ($N_2H_4$). The essential parts of each of these burners are a decomposed-gas nozzle 23, a hydrogen peroxide decomposition chamber 22 (containing a catalizer) disposed therein, and an auxiliary fuel nozzle 24 in central position within the chamber 22.

Pipe lines and leads such as the fuel-feeding pipe 5, leads of the motor power source and wiring 10, water pipe 13, inlet pipe of the main water nozzle 21, piping to the burners, and heat-sensor parts 26 and 31 of the temperature gages are introduced from the outside, through the wall of the engine outer cylinder 25, and to respective parts within the engine and are coupled to their respective outside devices by means of suitable connections (not shown) which are resistant to vibrations, corrosion, heat, pressure, and expansion.

The above described engine is provided with control means comprising known electrical, electronic, pneumatic, hydraulic (oil), and other devices, which are used independently or in combinations of two or more thereof to effect manual, semiautomatic, or automatic control.

The engine of the above described construction and organization according to this invention operates in the manner described below.

Referring to FIG. 1, when hydrogen peroxide is introduced under pressure into the decomposition chamber 22 of each burner, it decomposes because of the decomposition catalyst within the decomposition chamber into superheated steam at approximately 800° C and oxygen ($O_2$), which are then ejected through the decomposed-gas nozzle 23. Next, hydrazine is introduced under pressure through the auxiliary fuel nozzle 24 into the reaction chamber 19, whereupon the hydrazine reacts with the oxygen ($O_2$) simultaneously with the nozzle injection and ignites spontaneously.

By progressively increasing the flowrate of this hydrazine, the flame temperature of the burner is progressively raised. By holding constant the supply flowrate of the hydrazine when a combustion state of a flame temperature of approximately 1,500° C is attained, the flames at 1,500° C through all three nozzles are caused to coincide and concentrate at the center C of the reaction chamber 19 thereby to form a region of high heat energy.

The gases thus formed by this reaction act on the outside water which has previously entered the reaction chamber 19 and expel it through a reaction-gas passage 27 and out through the reaction gas outlet 30, the temperature of the reaction chamber being thereby caused to rise rapidly. This temperature rise is detected by the heat sensor 26, and at the instant when the temperature reaches approximately 1,200° C, water is introduced through the water pipe 13 and flows through the coiled tube 14, the collector pipe 15, and superheated-steam pipe 16 to the reaction chamber 19. In the reaction chamber, the temperature rise is suppressed by the absorption of heat for vaporization of this water, whereby the temperature within the reaction chamber is maintained at approximately 1,200° C.

Next the screw pump 6 is started to supply the granular metal fuel 4, together with the water supplied through the inlet pipe 3, through the fuel-preheating pipe 11 and fuel nozzle 12 into the reaction chamber 19. The metal fuel thus supplied together with the water passes through the region of high temperature where the flames of the burners meet and melts immediately, beginning to react with the steam within the reaction chamber.

Then, as the supply rate of the fuel 4 is progressively increased, the flowrate of the necessary water also increases. Consequently, the rate of generation of reaction heat also increases, and the temperature within the reaction chamber 19 becomes high. Accordingly, in accordance with the measurand of the heat sensor 26, water is sprayed into the reaction chamber through the main water nozzle 21 to complete the reaction of the fuel and vaporize surplus water. As the inerior of the reaction chamber 19 is thereby maintained at 1,400° C, which is a suitable temperature for reaction, high-temperature, high-pressure steam is continuously generated for use as motive power as desired.

In accordance with this increase in the rate of generation of steam, the temperature of the reaction-gas passage 27 rises, and the fuel-preheating pipe 11, coiled tube 14, and superheated-steam pipes 16 in the vicinity thereof are heated, whereby the granular metal fuel 4 is preheated during its passage through the preheating pipe 11 and, when it passes out from the fuel nozzle 12, the metal fuel has reached a temperature state immediately below melting. At the same time, this metal fuel mixes with the high-temperature steam injected into the reaction chamber 19 through the steam nozzle 17 as a result of steam generation in the steam collector pipe 15, and superheated-steam pipe 16 when water is supplied through the water pipe 13 and coiled tube 14. Thus, the metal fuel and steam assume a state wherein melt reaction is started without waiting for the effect of the burner flames.

Since this state can be monitored from the temperature of the steam flowing through the reaction-gas outlet 30 as detected by the heat-sensor 31, the burners are gradually throttled down from the state wherein this temperature reaches 1,000° C with respect to 1,400° C indicated by the heat sensor 26 in the reaction chamber 19, and the burners are stopped after it is verified that this indication does not full below 1,000° C. Thus, the operation enters a steady phase depending on only the metal fuel and water.

If, during this operation, an abrupt output change causes a decrease in the reaction chamber temperature and decreases in the temperatures indicated by the heat sensors 26 and 31 below the predetermined steady values 1,400° C and 1,000° C, the burners are promptly ignited and operated as an auxiliary heat source for maintaining the reaction temperature.

The high-temperature steam generated within the reaction chamber 19 is passed through the reaction-gas passage 27 and reaction-gas nozzle 28, where the steam flow is steadied by vanes 29, and the steam is injected through the reaction-gas outlet 30 and into the interior of the outer cylinder 25, acting as an ejector medium on the outside water in the water passage 36 and thereby propelling this water rearward. Then, as this steam and water flow rearward through the aforementioned heat-exchange section 37, a portion of the water is vaporized by heat received from the steam by direct heat exchange, and the resulting steam and water stream is steadied by the struts 34 and is ejected out through the water-jet nozzle 38 thereby to generate an engine propulsive force or thrust.

Depending on the necessity, it is also possible to add hydrogen peroxide to the water supplied through the main water nozzle 21 into the reaction chamber, thereby causing combustion of hydrogen in the reaction products to increase the efficiency and, moreover, producing a water jet without gas bubbles.

While this invention has been described above with respect to only a specific example of practice thereof wherein the invention is applied to an underwater engine of jet-propulsion type, it is not intended to be thus limited in scope. For example, the rear part of the nacelle can be made as a turbine rotor and provided with turbine blades and an output shaft, whereby a rotating engine is obtained.

Furthermore, this invention is not limited to the particular application to an underwater engine but can be applied with equal effectiveness to other surrounding mediums such as air. Moreover, provided that problem of heat resistance of the reaction chamber is solved, this invention can be applied to rocket engines and compound engines operating with metal and water as fuel within and without the earth's atmosphere.

I claim:

1. A method of generating motive power by heating a reaction chamber to a temperature sufficient for exothermic reaction between a fuel metal in a molten state and water: said method comprising, in combination, the steps of supplying said metal in a granular solid state of high fluidity by pressurized water of a first quantity adapted to only fill the fine gaps between the metal particles to form a gas-tight seal, said water being vaporized by heat exchange, during passage together with the metal fuel through a conductive tube communicating with the reaction chamber, into high-pressure steam adapted to maintain the metal fuel particles in a solid state and to cause the metal particles to be ejected as a fine spray into the reaction chamber through a fuel nozzle;

injecting high temperature steam, generated by vaporizing water of a second quantity, into the reaction chamber at a point near the fuel nozzle so as to cause direct contact between said steam and the metal particles ejected from said fuel nozzle thereby to fuse the fuel metal particles and to start said reaction, the sum of said first and second quantities of the water being sufficient for said reaction; and ejecting water of a third quantity adapted to complete said reaction, to cause surplus water to be vaporized by the heat of the reaction, and to generate high-temperature steam for said motive power, said steam being ejected through a reaction gas outlet as a motive power source and utilized to maintain the reaction chamber temperature within a maximum limit.

2. A method according to claim 1, further comprising detecting the temperature at at least two locations including the location under reaction and the location of the ejected power steam, controlling the flow-rates of the metal fuel and water quantities in response to the results of said temperature detection, thereby to continuously carry out the reaction in the reaction chamber.

3. A method of generating motive power according to claim 1 in which said metal is a member selected from the group consisting of aluminum, magnesium, zinc, alloys thereof, and mixtures of at least two of said metals and alloys.

4. A method of generating motive power according to claim 1 in which an oxidizing agent is admixed with the water of the third quantity thereby to cause combustion also of hydrogen generated by the reaction.

5. An apparatus for generating motive power by heating a reaction chamber to a temperature sufficient for exothermic reaction between a fuel metal in a molten state and water; said apparatus comprising, in combination, first means for supplying said fuel metal in a granular solid state;

second means for mixing pressurized water of a first quantity with said fuel metal so as to fill the fine gaps between the metal particles to form a gas seal;

a conductive tube communicating between said first means and said reaction chamber adapted for the passage of the mixture of the fuel metal and water therethrough, means for vaporizing the water by heat exchange into high-pressure steam while maintaining the fuel metal particles in their solid state during passage through said conductive tube;

a first fuel nozzle adapted to eject said mixture as a fine spray into the reaction chamber;

third means provided adjacent said fuel nozzle for ejecting high-temperature steam, generated by vaporizing water of a second quantity into the reaction chamber and to cause direct contact between said steam and the fuel metal particles ejected from said fuel nozzle, thereby to start the reaction in the reaction chamber;

fourth means for ejecting water of a third quantity which is sufficient to complete said reaction, to cause surplus water to be vaporized by the heat of the reaction, and to generate high-temperature steam for said motive power;

a reaction gas outlet in communication with said reaction chamber to eject said steam generated by said fourth means to provide said motive power, said steam being utilized to maintain the reaction chamber temperature within a maximum limit; and heating means adapted to heat, as an auxiliary heat source, the reaction chamber, thereby to cause effective starting and restarting of the reaction and to adjust the reaction temperature.

6. An apparatus according to claim 5, in which at least two temperature detecting means are provided, one being disposed at the center of the reaction chamber and the other being disposed at the reaction gas outlet of the reaction chamber, control means responsive to said detecting means for controlling the flowrates of the fuel metal, the first, second and third quantities of water, to cause continuous reaction in the reaction chamber.

7. Apparatus for generating motive power according to claim 6 in which the reaction chamber constitutes an upstream part of a reaction tube extending downstream to said exhaust opening, said means for supplying the metal and said means for vaporizing water of a second flowrate having conduit parts disposed within said reaction tube to receive heat by heat-exchange from said high-temperature, high-pressure steam, whereby the operation of the apparatus is automatic and self-sustaining except during the use of said heating means.

8. Apparatus for generating motive power according to claim 6 in which said heating means comprises at least one burner of spontaneous-combustion type disposed to direct a flame toward the center of the reaction chamber, and said means for injecting water of a third flowrate is provided with means for admixing an oxidizing agent with the water of the third flowrate thereby to cause combustion also of hydrogen generated by the reaction.

9. Apparatus for generating motive power according to claim 5 in which said metal is a member selected from the group consisting of aluminum, magnesium, zinc, alloys thereof, and mixtures of at least two of said metals and alloys.

10. Apparatus for generating motive power according to claim 5 which further comprises guide means for utilizing the energy of said high-temperature, high-pressure steam to drive an ambient fluid medium thereby to generate thrust.

11. Apparatus for generating motive power according to claim 5 which further comprises a mechanism drivable by fluid mediums and guide means for utilizing the energy of said high-temperature, high-pressure steam to drive said mechanism.

12. Apparatus for generating motive power according to claim 5 which further comprises means for directing and utilizing said high-temperature, high-pressure steam to generate thrust.

13. Apparatus for generating motive power according to claim 10 in which said ambient fluid medium is air.

14. Apparatus for generating motive power according to claim 10 in which said ambient fluid medium is water.

* * * * *